(12) United States Patent
Dunaway

(10) Patent No.: US 8,230,638 B1
(45) Date of Patent: Jul. 31, 2012

(54) MOTION DECOY AND DECOY MOUNTING SYSTEM

(76) Inventor: Glenn A. Dunaway, Jayess, LA (US)

( * ) Notice: Subject to any disclaimer, the term of this patent is extended or adjusted under 35 U.S.C. 154(b) by 336 days.

(21) Appl. No.: 12/493,628

(22) Filed: Jun. 29, 2009

(51) Int. Cl.
A01M 31/06 (2006.01)
(52) U.S. Cl. .................................. 43/2; 43/3
(58) Field of Classification Search .............. 43/2, 3
See application file for complete search history.

(56) References Cited

U.S. PATENT DOCUMENTS

| 4,965,953 | A | * | 10/1990 | McKinney | 43/2 |
| 5,274,942 | A | * | 1/1994 | Lanius | 43/2 |
| 5,459,958 | A | * | 10/1995 | Reinke | 43/2 |
| 6,487,810 | B1 | * | 12/2002 | Loughman | 43/2 |
| 2003/0106253 | A1 | * | 6/2003 | Loughman | 43/2 |
| 2007/0180755 | A1 | * | 8/2007 | Neeley et al. | 43/3 |
| 2009/0107026 | A1 | * | 4/2009 | Wyant | 43/2 |
| 2010/0064569 | A1 | * | 3/2010 | Wyant | 43/2 |

* cited by examiner

Primary Examiner — Christopher P Ellis
(74) Attorney, Agent, or Firm — Roy Kiesel Ford Doody and Thurmon

(57) ABSTRACT

A novel and improved turkey motion decoy and decoy mounting system is disclosed. The mounting system comprises a plurality of movable frames to support a decoy body and tail, to thereby provide a decoy capable of moving its body parts to imitate the realistic mating behavior of a turkey.

17 Claims, 6 Drawing Sheets

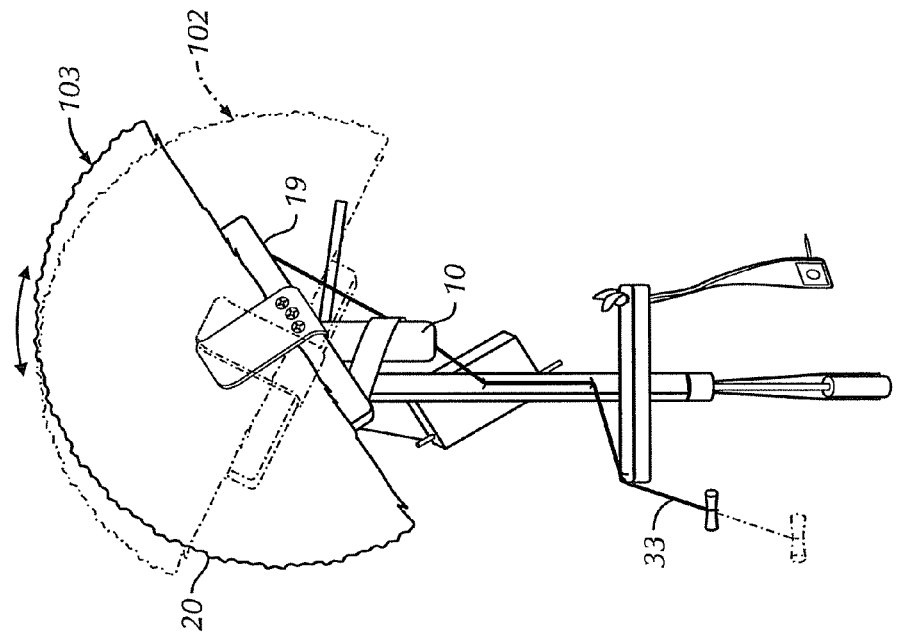
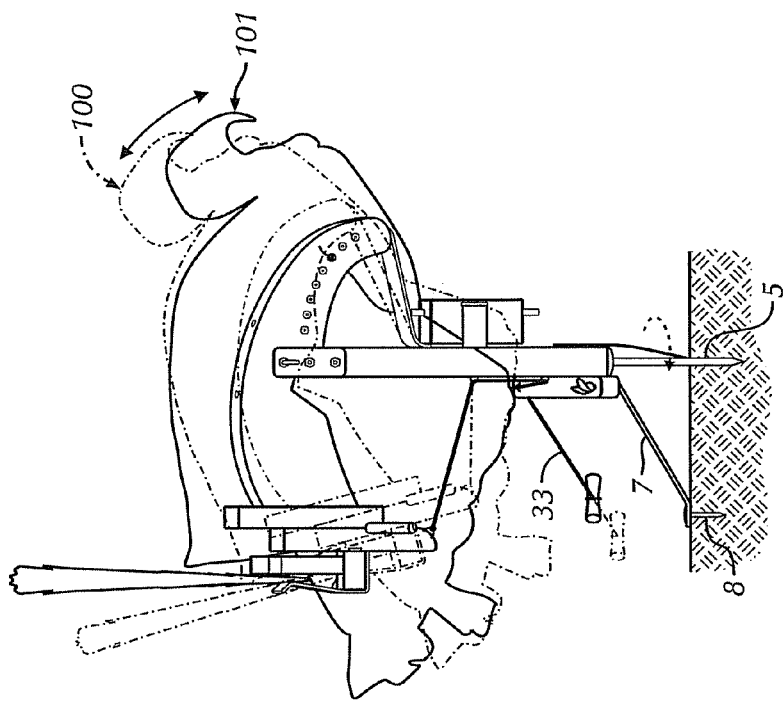
FIG. 8
FIG. 7

MOTION DECOY AND DECOY MOUNTING SYSTEM

BACKGROUND OF THE INVENTION

1. Field of the Invention

This invention relates to hunting decoys in general and to a new and improved turkey motion decoy and decoy mounting system, in particular.

2. Prior Art

Decoys come in many designs and configurations and are well known and utilized in the prior art. For example, in turkey hunting applications, hunters commonly utilize a plurality of decoys, namely several hens and a gobbler that is displayed in a puffed-up fashion in front of the hens. Such a display is a challenge and enticement to other gobblers. Such turkey decoys comprise various mechanisms for triggering gobbler enticement, and are to a varying degree successful, however an improvement over what is available in the prior art is desired. For example, many such prior art turkey decoys are not very effective because they do not generate sufficient movement or flash to entice the gobbler. Other types of prior art turkey decoys generate an unnatural and erratic movement. This in turn, results in a presentation of the decoy that is not life-like, and thus unlikely to result in a gobbler approach. Thus, many of these prior art turkey decoys are neither efficient nor reliable and their use often results in unsatisfactory hunting results. In addition, many of these prior art turkey decoys are often complicated in construction, thereby making it difficult for novice users to utilize them. Such turkey decoys also have increased manufacturing costs due to their complexity. For these reasons, a turkey decoy meeting the following objectives would be highly desirable in the industry.

OBJECTS OF THE INVENTION

It is an object of this invention to provide an improved turkey decoy and decoy mounting system that overcomes the disadvantages of the prior art.

It is another object of this invention to provide an improved turkey decoy that provides for a more natural and lifelike movement.

It is yet another object of this invention to provide an improved turkey decoy that is more visually appealing to the gobbler.

It is another object of the invention to provide an improved turkey decoy that takes the form of a gobbler and is configured to imitate a gobbler's mating behavior, to entice other gobblers.

It is another object of this invention to provide an improved turkey decoy that increases the likelihood of gobbler approach.

It is another object of this invention to provide an improved turkey decoy and decoy mounting system that is reliable, efficient, and easy to use.

Yet another object of this invention is to provide an improved turkey decoy and decoy mounting system that is simple in construction and thus capable of being manufactured at a reduced cost.

These and other objects of the invention shall become apparent from the ensuing figures and descriptions of the invention.

SUMMARY OF THE INVENTION

A decoy mounting system, for a motion decoy, comprising a support; a body tilting feature comprising a pivotable decoy body mount frame for attachment of a decoy body; a tail flagging feature comprising a pivotable tail mount frame for attachment of a decoy tail; a calling feature comprising a call box; wherein said body mount frame, said tail mount frame, and said call box are operatively affixed to the pull cord; whereby said body mount frame and said tail mount frame are configured to pivot, and whereby said call box is configured to be engaged, in response to a force applied to the pull cord.

BRIEF DESCRIPTION OF THE FIGURES

The accompanying drawings illustrate a preferred embodiment of this invention. However, it is to be understood that these embodiments are not intended to be exhaustive, nor limiting of the invention. They are but examples of some of the forms in which the invention may be practiced.

FIG. 7 depicts the pivotal movement of the decoy mount frame and decoy body.

FIG. 8 depicts the pivotal movement of the tail mount frame and decoy tail.

DETAILED DESCRIPTION OF THE INVENTION

Figure 2:
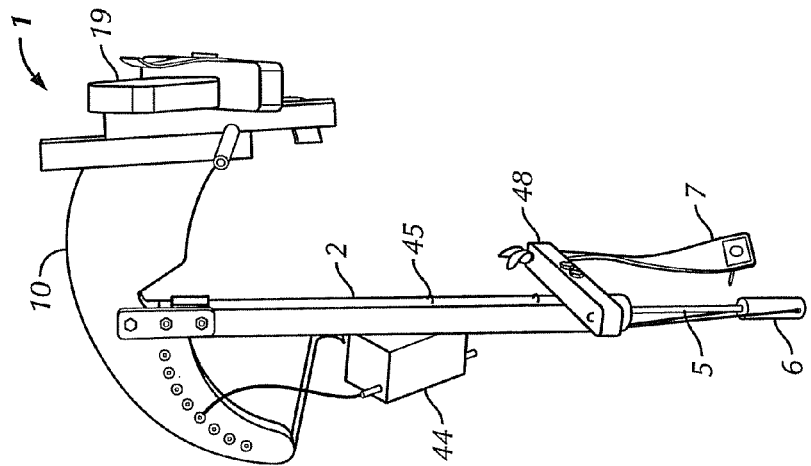
FIG. 2 is another side perspective view of a preferred embodiment of the improved decoy mounting system of the present invention.
Figure 1:
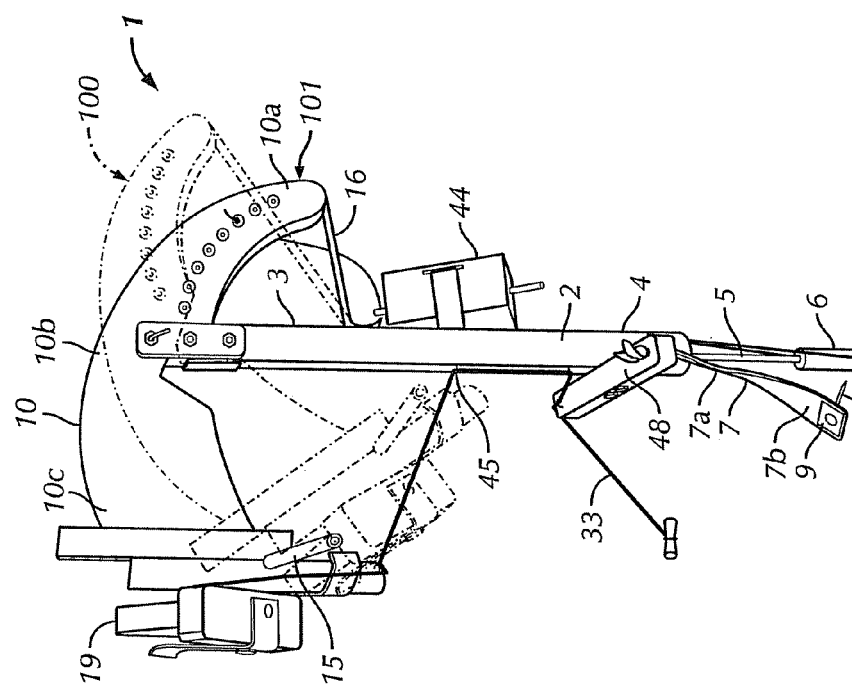
FIG. 1 is a side perspective view of a preferred embodiment of the improved decoy mounting system of the present invention.
Figure 4:
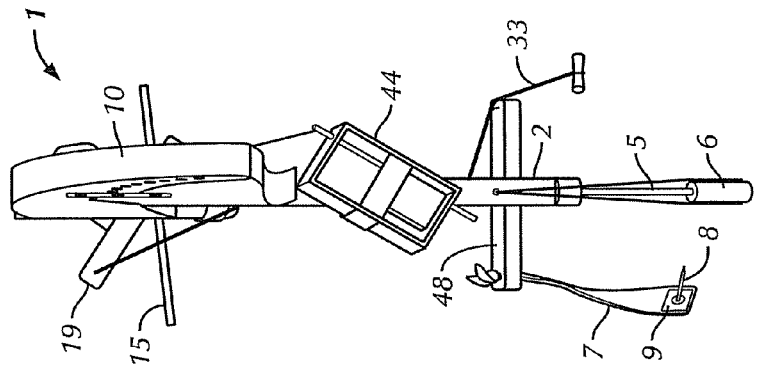
FIG. 4 is a front perspective view of a preferred embodiment of the improved decoy mounting system of the present invention.
Figure 3:
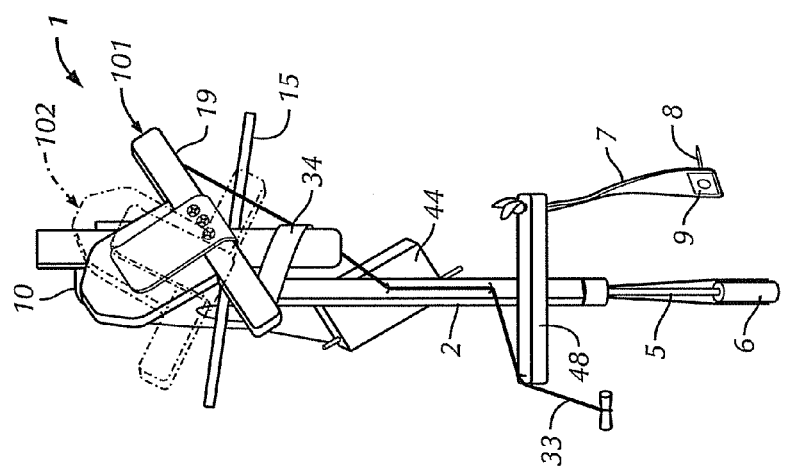
FIG. 3 is an end perspective view of a preferred embodiment of the improved decoy mounting system of the present invention.
Figure 6:
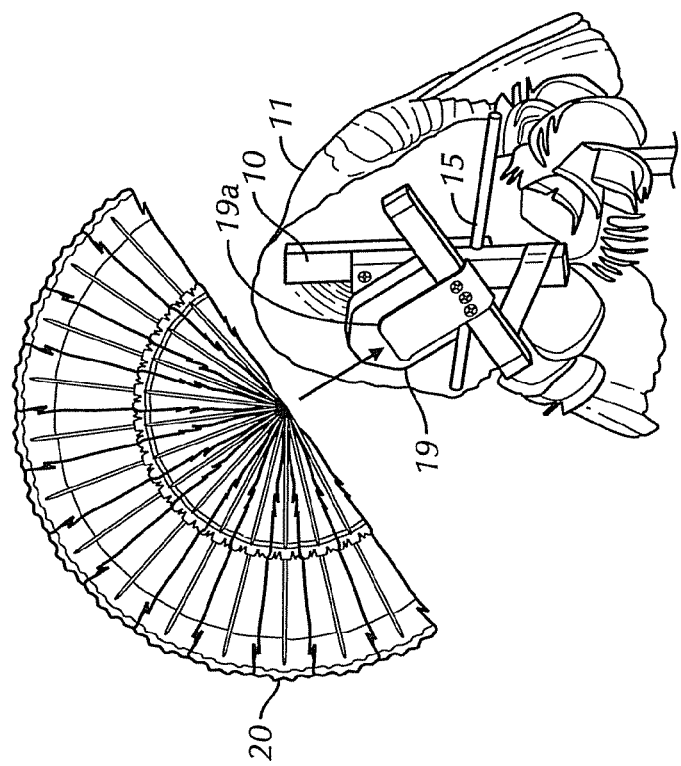
FIGS. 5 and 6 depict a decoy body and decoy tail being mounted to the improved decoy mounting system of the present invention.
Figure 5:
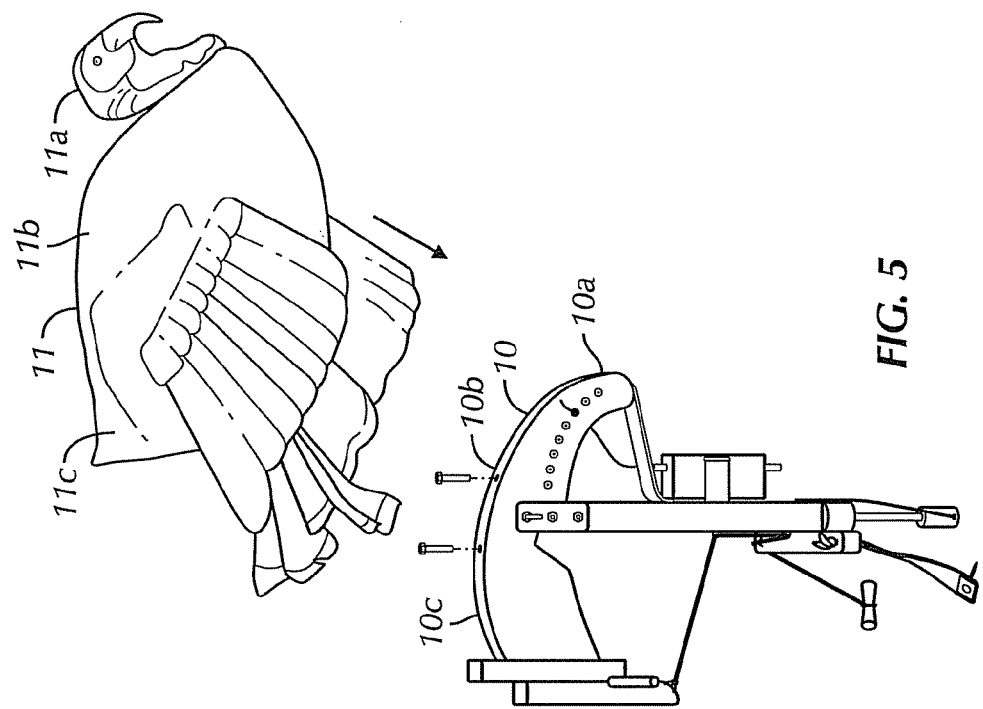
Figure 9A:
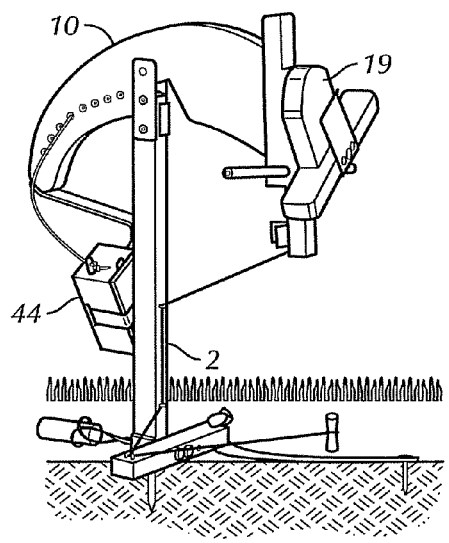
FIGS. 9A, 9B, 9C are perspective views of the improved decoy mounting system of the present invention. 9A is the starting position. 9B shows the activation of the body rotation feature and the tail flagging feature. 9C shows the activation of the body tilting feature, and the calling feature, with the body rotated to the maximum angle.
Figure 9B:
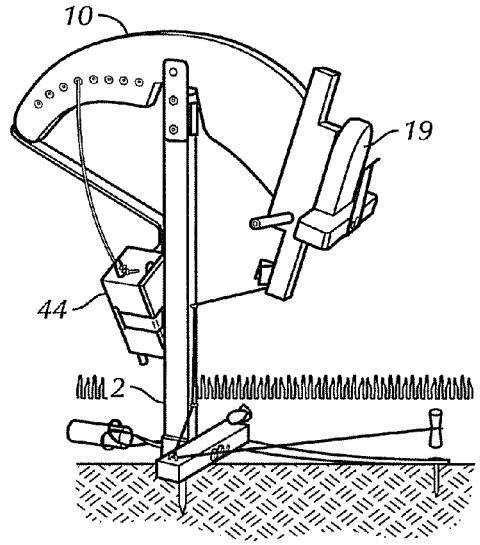
Figure 9C:
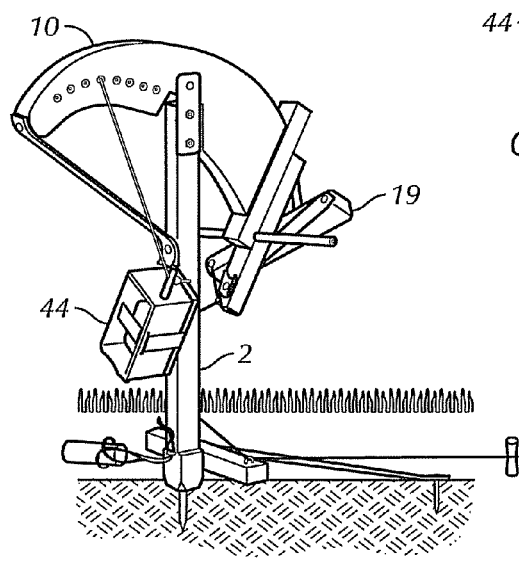
Figure 10A:
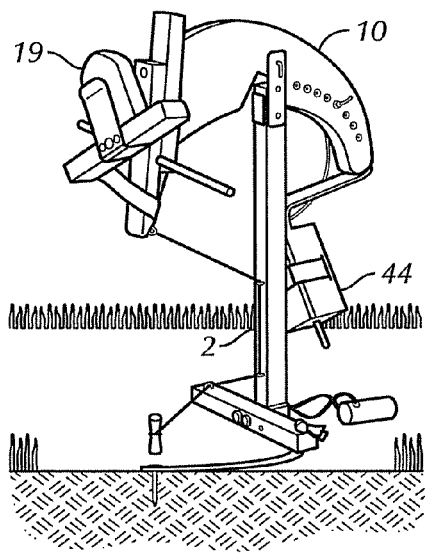
FIGS. 10A, 10B, and 10C correspond to FIGS. 9A, 9B, 9C, respectively, however are shown from the rear perspective.
Figure 10B:
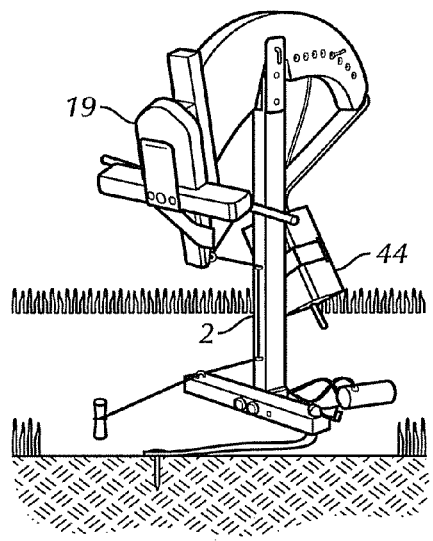
Figure 10C:
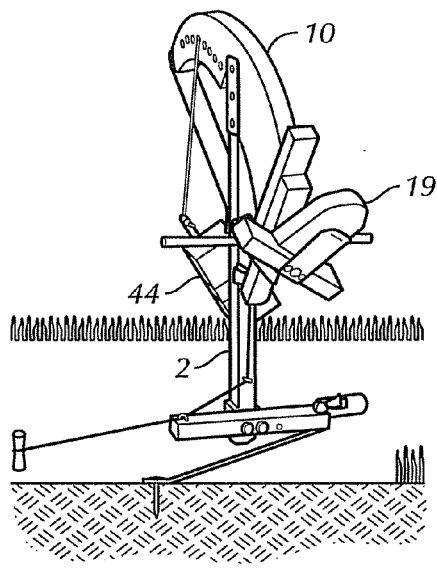

An improved turkey motion decoy and decoy mounting system, collectively referenced by the numeral 1, is disclosed. The invention is designed to provide a visually appealing and lifelike gobbler decoy to another gobbler to thereby increase chances of gobbler enticement and approach, in hunting operations.

The decoy mounting system 1 of the invention is relatively simple, yet durable, in construction. The decoy mounting system 1 can be designed to be of whatever size is suitable for the particular hunting situation. Mounting system 1 comprises a main frame 2 having an upper end 3 and a lower end 4, said lower end comprising a stake 5 for anchoring main frame 2 into the ground. Main frame 2 can be a variety of widths and lengths, but should basically be manufactured in accordance with the decoy body to be supported and the ground conditions in concern. Stake 5 further comprises a spiral, beveled, or sloped tip to provide for a stake that can be utilized as an auguring device. Stake 5 includes a removable safety cap 6, so that stake 5 does not cause injury to the user.

To provide additional grounding stability to decoy mounting system 1, a strap 7 can be provided to system 1. In a preferred embodiment, strap 7 will comprise two ends 7a and 7b. At one end 7a, strap 7 will be affixed to a horizontal bar 48 provided to main frame 2, and at other end 7b, strap 7b will comprise a screw 8 and compression plate 9 assembly, with said screw 8 configured to be rotated into the ground, to secure strap 7 thereto.

In a preferred embodiment, decoy mounting system 1 further comprises a decoy mount frame 10 pivotally attached to upper end 3 of main frame 2 via appropriate hinge pins or the like. As will be discussed further below, decoy mount frame 10 will be configured to be pivotally movable in and up-and-down manner, when a pull cord 33 is pulled and released. A biasing member 16, such as a spring or a plastic strap, will be affixed at one end 16a to main frame 2, and at other end 16b to decoy mount frame 10. Biasing member 16 will push frame 10 back to starting position, when cord 33 is not pulled. Decoy mount frame 10 is preferably arc shaped, however may be any other shape or size, suitable to receive and mount the desired decoy body 11. Decoy mount frame 10 preferably comprises a head section 10a, a mid section 10b, and an end section 10c. In a preferred embodiment, decoy mount frame 10 may be permanently affixed to main frame 2 by welding or other such means; alternatively, it may be a detachable piece that can be readily secured to main frame 2 for easy assembly.

Decoy body 11 is preferably hollow, flexible and comprised of plastic. Decoy body 11 will generally comprise a head section 11a, a mid section 11b, and a backside section 11c. Non-exhaustive commercially available examples of suitable decoy bodies 11 include the Feather Flex™ Turkey Decoys and Primos® Jake Mobile Turkey Decoys, although it is contemplated that other types of decoy bodies 11 compatible with the invention may also be utilized. Although the desired decoy body 11 in turkey-hunting applications will resemble a gobbler, it is contemplated that decoy mount frame 10 can be specifically configured to receive and mount a decoy body 11 that resembles a hen as well.

In a preferred embodiment, decoy body 11 will be detachably mounted to decoy mount frame 10 in a parallel fashion. In a preferred method of attachment, decoy body 11 will be provided with a first plurality of openings and decoy mount frame will be provided with a second plurality of openings, said second plurality of openings aligned with said first plurality of openings. Decoy body 11 will then be mounted in position on decoy mount frame 10 via a bolt assembly comprising bolts and locking washers. Bolts should have sufficient length to extend through aligned openings in decoy body 11 and decoy mount frame 10, respectively. In a preferred embodiment, decoy mount frame 10 will further comprise an expander bar 15 affixed to its end section 10c, such that when decoy body 11 is mounted in a parallel fashion upon decoy mount frame 10, expander bar 15 will function to space the opposite walls of flexible decoy body 11, to keep backside 11c of decoy body 11 spread apart for a puffed-up and full appearance. Expander 15 bar also functions to keep clearance for detachable decoy tail 20 movement, discussed below.

Continuing with a discussion of a preferred embodiment of the invention, decoy mount frame 10 may further comprise a tail mount frame 19 pivotally affixed to its end section 10c. Tail mount frame 19 in turn will comprise an insertion slot 19a, such that a detachable decoy tail 20 can be mounted to frame 19. An illustrative example of a commercially available detachable tail that can be utilized with the present invention is RedHead™, available from Bass Pro, although any other type of compatible detachable tail may be utilized. As will be discussed further below, tail mount frame 19 will be configured to be pivotally movable in a side-to-side manner, when pull cord 33 is pulled and released. A biasing member 34, such as a spring or a plastic strap, will be affixed at one end 34a to decoy mount frame 10, and at other end 34b to tail mount frame 19. Biasing member 34 will push frame 19 back to starting position, when cord 33 is released. Tail mount frame 19 is an optional feature of the invention, as decoy body 11 may already comprise a fixed tail, as in the case of a decoy body 11 resembling a hen. However, it is preferred that decoy body 11 and detachable decoy tail 20 be separate elements, capable of being moved separately, as will be discussed further below.

In a preferred embodiment, decoy mounting system 1 will further comprise a call box 44. Call box 44 will preferably be attached to main frame 2, and will further be operatively affixed to pivotal decoy mount frame 10, such that when frame 10 pivots in response to a force applied to pull cord 33, call box 44 will become engaged. The call can include hen clucking noises, or any other appropriate gobbler-enticing noise.

As mentioned above, decoy mounting system 1 will further comprise a pull-cord 33 having a user controlled end 33a. Pull-cord 33 will preferably be routed through guide stakes 45 or pulleys situated along decoy mounting system. Pull-cord 33 will be operatively affixed to main frame 2, decoy mount frame 10 and tail mount frame 19. In a preferred embodiment, pull-cord 33 and main frame 2 should be configured such that when a manual or mechanical force is exerted on control end 33a of cord 33, main frame 2 will partially rotate in response. This will herein be referred to as the body rotating feature. In a further preferred embodiment, pull-cord 33 and tail mount frame 19 should be configured such that when a force is exerted on control end 33a of cord 33, tail mount frame 19 will pivot to a side position 102, and when there is no longer a force on cord 33, biasing member 34 will push tail mount frame 19 back to its starting position 103. This will herein be referred to as the tail flagging feature. In a further preferred embodiment, pull-cord 33 and decoy mount frame 10 should be configured such that when a force is exerted on control end 33a of cord 33, decoy mount frame 10 will pivot to an upwards position 100, and when there is no longer a force on cord 33, biasing member 16 will push decoy mount frame 10 back downwards to its starting position 101. This will herein be referred to as the body tilting feature. As discussed above, call box 44 will be operatively affixed to pivotal decoy mount frame 10 such that when frame 10 pivots to upward position 100, call box 44 will subsequently become engaged. This will herein be referred to as the calling feature. In a preferred embodiment, these features will be activated sequentially, as will now be discussed.

In yet a further preferred embodiment, cord 33, main frame 2, decoy and tail mount frames 10 and 19, and call box 44 will be configured such that the amount of force exerted upon cord 33 will determine the timed activation of a particular feature. For example, a slight pull upon cord 33 may initially activate only the body rotating feature. A stronger pull may subsequently activate the tail flagging feature second and the body tilting feature third. An even stronger pull may activate all of the above three features sequentially, and the calling feature last. Of course, this described sequence can vary, depending on what is desired and invention can be configured to provide any other alternative sequence. It is also contemplated that cord 33, main frame 2, decoy and tail mount frames 10 and 19, and call box 44 can be configured such that all four features are activated simultaneously. Alternatively, some features can be activated simultaneously while others are activated sequentially.

As can be seen from the foregoing discussion, decoy and decoy mounting system 1 of the present invention is relatively simple in construction, making it capable of being manufactured at a reduced cost. In constructing decoy mounting system 1, the inventor contemplates using materials such as wood and metal, however it is anticipated that various other materials could also be suitable to construct the components of decoy mounting system 1, so as to provide for a durable and reliable construction. The suitability of a certain material would depend on various factors such as the size and weight of the decoy body 11 to be mounted and the ground conditions in concern.

In a preferred method of operation, the user will first assemble decoy and decoy mounting system 1 in a quick and easy manner. The hunter will mount decoy body 11, configured to resemble a gobbler, upon decoy mount frame 10 and decoy tail 20 upon tail mount frame 19, in the manner discussed above. Main frame 2 of mounting system 1 will then be anchored into the ground at the desired location, via stake 5. Strap 7 may then be secured to the ground for additional stability. This is accomplished via screw 8 of strap 7, said screw 8 being rotated into the ground until compression plate 9 hits the soil. Once decoy and decoy mounting system 1 has been assembled, anchored, and strapped into place, one or more passive hen decoys may then be situated adjacent decoy body 11.

The hunter will then initiate motion of decoy and decoy mounting system 1 with a manual or mechanical pull of cord 33. In a first preferred embodiment of operation, a slight pull on cord 33 will activate only the body rotation feature. In this embodiment, main frame 2 will rotate slightly such that decoy body 11 is facing passive hen decoy(s). In a second preferred embodiment of operation, a stronger pull will subsequently activate the tail flagging feature. In this embodiment, tail mount frame 19, and tail 20, mounted thereupon, will pivot to a side position 102, when cord 33 is pulled, and will be pushed back to starting position 103, when cord 33 is released. In a third preferred embodiment of operation, an even stronger pull will subsequently activate the body tilting feature. In this embodiment, decoy mount frame 10 and decoy body 11, mounted thereupon, will pivot to an upward position 100, when cord 33 is pulled, and will be pushed back down to starting position 101 when cord 33 is released. In a fourth preferred embodiment of operation, and applying maximum force to cord 33, call box 44 will become engaged, subsequent to the body tilting feature becoming activated. Thus, via controlled pull and release of cord 33, decoy tail 20 will reciprocate between a left and right position, decoy body 11 will reciprocate between an up and down position, and call box 44 will intermittently emit appropriate sounds, such as a hen cluck. This will give the impression that the passive hen decoy is clucking and that the gobbler is flagging its tail feathers from side to side and tilting its body up and down. In this manner, the present invention will simulate the lifelike body and tail movements of a gobbler engaging in mating behavior. This behavior in turn will be viewed as a territorial challenge by other gobblers, inducing them to approach.

In summary, the decoy and decoy mounting system 1 of the present invention comprises a unique selection and assembly of components to impart distinct and effective movements such that its attractiveness to gobblers is enhanced. The invention looks, sounds, and moves convincingly like a turkey decoy, but at the same time, is versatile, inexpensive, and simple in construction. While the invention has been described in terms of its preferred embodiment, other embodiments will be apparent to those of skill in the art from a review of the foregoing. Those embodiments as well as the preferred embodiments are intended to be encompassed by the scope and spirit of the following claims.

I claim:

1. A decoy mounting system, for a motion decoy, comprising:
    a. a support;
    b. a pivotable decoy body mount frame for attachment of a decoy body;
    c. a pivotable tail mount frame for attachment of a decoy tail;
    d. wherein said body mount frame and said tail mount frame are operatively affixed to a pull cord;
    e. whereby, in response to a force applied to the pull cord, said body mount frame is configured to pivot about a first axis and said tail mount frame is configured to pivot about a second axis having an orientation substantially perpendicular to the first axis.

2. A decoy mounting system according to claim 1, wherein the body mount frame is configured to pivotally reciprocate in an up and down manner relative to the vertical support, and wherein the tail mount frame is configured to pivotally reciprocate in a side to side manner relative to the vertical support, in response to the pull and release of the cord.

3. A decoy mounting system according to claim 1, wherein a decoy tail is provided to the tail mount frame, wherein said decoy tail is configured to simulate a turkey tail.

4. A decoy mounting system according to claim 1, further comprising a call box operatively affixed to the body mount frame, such that when the body mount frame pivots, the call box is engaged.

5. A decoy mounting system, for a motion decoy, comprising:
    a. a support;
    b. a tilting feature comprising a pivotable decoy body mount frame for attachment of a decoy body;
    c. a flagging feature comprising a pivotable tail mount frame for attachment of a decoy tail;
    d. wherein said body mount frame and said tail mount frame are operatively affixed to the pull cord;
    e. whereby, in response to a force applied to the pull cord, said body mount frame is configured to pivot about a first axis and said tail mount frame is configured to pivot about a second axis having an orientation substantially perpendicular to the first axis.

6. A decoy mounting system according to claim 5, wherein the body mount frame is configured to pivotally reciprocate in an up and down manner relative to the vertical support, and wherein the tail mount frame is configured to pivotally reciprocate in a side to side manner relative to the vertical support, in response to the pull and release of the cord.

7. A decoy mounting system according to claim 5, wherein the body mount frame and the tail mount frame are configured such that the amount of force exerted upon the cord will determine which particular feature is activated.

8. A decoy mounting system according to claim 7, wherein the flagging feature and the body tilting feature are configured to be activated sequentially, in response to a progressively increasing force exerted upon the cord.

9. A decoy mounting system according to claim 5, wherein the two features are configured to be activated simultaneously in response to a force applied to the pull cord.

10. A decoy mounting system according to claim 5 further comprising a rotating feature, wherein the support is operatively affixed to the cord and anchored to a ground surface, wherein the decoy body mount frame is configured to rotate around an axis that is substantially orthogonal to the ground in response to a force applied to the pull cord.

11. A decoy mounting system according to claim 5 further comprising a calling feature comprising a call box.

12. A decoy mounting system according to claim 11 wherein the call box is operatively affixed to the pull cord and configured to be engaged in response to the force applied to the pull cord.

13. A decoy mounting system for a motion decoy, comprising:
   a. a support configured to support the motion decoy, wherein the support is configured to be anchored to a ground surface and operatively affixed to a pull cord;
   b. a decoy body mount frame for attachment of a decoy body, wherein the decoy body mount frame is affixed to the support and configured to rotate around an axis that is substantially orthogonal to the ground surface in response to a force applied to the pull cord; and,
   c. a tail mount frame for attachment of a decoy tail, wherein the tail mount frame is affixed to the decoy body mount frame and operatively affixed to the pull cord, wherein the tail mount frame is configured to pivot about an axis that is substantially parallel to the ground surface in response to a force applied to the pull cord.

14. A decoy mounting system according to claim 13, wherein the tail mount frame is configured to pivotally reciprocate in a side to side manner in response to the pull and release of the cord.

15. A decoy mounting system according to claim 13, wherein the decoy body mount frame is pivotable and operatively affixed to the pull cord and configured to pivot in response to a force applied to the pull cord.

16. A decoy mounting system according to claim 15, wherein the decoy body mount frame is configured to pivotally reciprocate in an up and down manner.

17. A decoy mounting system according to claim 16 further comprising a calling feature comprising a call box, wherein, the call box is operatively affixed to the pull cord and configured to be engaged in response to the force applied to said pull cord.

* * * * *